Patented May 3, 1927.

1,626,872

UNITED STATES PATENT OFFICE.

WILLIAM C. PIVER, OF HILLSIDE, NEW JERSEY.

PROCESS FOR MAKING AN INSECTICIDE.

No Drawing.   Application filed March 30, 1923.   Serial No. 628,774.

This invention relates to a process of making an insecticide, which results in the production of a dry powdered form of the same free from soluble arsenic salts, which would render the product dangerous to foliage, when used as an insecticide.

In addition to the foregoing object of the invention, one of the features or results of the process is the imparting of an adhesive property to the product produced which is very much greater than that possessed by the ordinary product, or the product produced by the heretofore known methods. This is especially desirable when the arsenate is used, as it is largely used, for an insecticide and dusted on the foliage and, as will be apparent, is only effective to the extent to which it adheres thereto.

Another feature of this process is found in the production of the dry powdered form of the product directly from the chemical reactions, without the necessity of recovering the paste form of precipitate and then drying the same out, which is necessary in the usual commercial methods now in use.

In carrying out my process, a calcium compound, such as calcium oxide or calcium hydroxide, is treated or acted upon with a metallic oxide, such as arsenic acid, or a soluble metallic arsenic salt, of sufficient concentration to remove all of the free water therefrom, or to "slack" the lime (calcium oxide), and still leave the mass in a dry state at the end of the reaction, an excess of calcium oxide being used sufficient to take up all of the water released from the arsenic salt or acid. The result of this is a dry powdered form of calcium arsenate and a very short time is required for its production.

I have found that the desirable adhesive properties may be imparted to the product by the addition of a metallic salt, such as aluminium silicate or sulphate, during the reaction. The quantity of this salt used may be from ½ of 1% to 5% of the predetermined weight of the finished product. Also this salt exerts a neutralizing effect on any free arsenic oxide, or its basic or acid salts, not combined in the main reaction.

I have found that sodium arsenate may be used instead of or mixed with the arsenic acid and that salts of iron, barium, zinc or nickel may also be used instead of the aluminium salt, although I believe the arsenic acid and aluminium salt are preferable, as I have found by comparative tests that these give the best results and produce a product which is not only easily manufactured in a much quicker time, on account of its being produced directly from the reaction, but that the product is in that dry finely powdered form which is necessary when the same is to be used as an insecticide and that it possesses the additional and very desirable feature of decidedly increased adhesive qualities, as well as being substantially free from any soluble arsenic salts, thus producing a product especially adapted for use as an insecticide and which may be used, without danger of injury to the foliage, by either dusting or wet spraying thereon.

What I claim is:—

1. The process of making an insecticide which consists in a soluble arsenic compound acting on an excess of calcium oxide, and the addition of a metallic salt during the reaction adapted to impart adhesive property to the product, producing the insecticide in a dry powdered form.

2. The process of making an insecticide which consists in a soluble oxide of arsentic acting on an excess of calcium oxide, and the addition of a metallic salt during the reaction adapted to impart adhesive property to the product, producing the insecticide in a dry powered form.

3. The process of making an insecticide which consists in arsenic acid acting on an excess of calcium oxide and a metallic salt adapted to impart adhesive property to the product, producing the insecticide in a dry powdered form.

4. The process of making an insecticide which consists in a plurality of soluble arsenic compounds acting on an excess of calcium oxide and a metallic salt adapted to impart adhesive property to the product, producing the insecticide in a dry powdered form.

5. The process of making an insecticide which consists in a soluble arsenic compound acting on an excess of calcium oxide and an aluminium salt adapted to impart adhesive property to the product, producing the product in a dry powdered form.

6. The process of making an insecticide which consists in arsenic acid acting on an excess of calcium oxide and aluminium silicate, producing the product in a dry powdered form.

7. The process of making an insecticide which consists in a soluble arsenic compound acting on an excess of calcium oxide and adding a compound adapted to impart an increased adhesive property to the dry powdered insecticide thus produced.

8. The process of making an insecticide which consists in a plurality of soluble arsenic compounds acting on calcium oxide and a metallic salt adapted to impart adhesive property to the product, to produce a dry powdered form of product with increased adhesive property direct from the reaction.

9. An insecticide in dry powdered form, comprising calcium arsenate and aluminium arsenate.

Signed at New York, in the county of New York and State of New York, this 9th day of March, A. D. 1923.

WILLIAM C. PIVER.